(12) United States Patent
Yazawa et al.

(10) Patent No.: US 8,134,263 B2
(45) Date of Patent: Mar. 13, 2012

(54) BEARING UNIT, MOTOR USING THE BEARING UNIT, AND ELECTRONIC EQUIPMENT USING THE MOTOR

(75) Inventors: Kenichiro Yazawa, Tokyo (JP); Hiroshi Sato, Chiba (JP); Yoshiaki Kakinuma, Tokyo (JP); Ichiro Koyanagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 12/205,214

(22) Filed: Sep. 5, 2008

(65) Prior Publication Data
US 2009/0072643 A1 Mar. 19, 2009

(30) Foreign Application Priority Data

Sep. 6, 2007 (JP) ................................. 2007-231843

(51) Int. Cl.
*H02K 5/16* (2006.01)
*H02K 7/08* (2006.01)

(52) U.S. Cl. .......... 310/90; 384/101; 384/131; 384/132; 384/119

(58) Field of Classification Search .................... 310/90; 384/119, 101, 131, 132; *H02K 7/08, 5/16*
See application file for complete search history.

(56) References Cited

U.S. PATENT DOCUMENTS

| | | | | |
|---|---|---|---|---|
| 4,524,977 A * | 6/1985 | Masaaki | | 384/132 |
| 5,610,462 A * | 3/1997 | Takahashi | | 310/90 |
| 7,510,329 B2 * | 3/2009 | Shishido et al. | | 384/107 |
| 7,654,744 B2 * | 2/2010 | Obara et al. | | 384/119 |
| 2003/0133633 A1 * | 7/2003 | Nakamura | | 384/107 |
| 2003/0161558 A1 * | 8/2003 | Kishi | | 384/107 |
| 2004/0141668 A1 * | 7/2004 | Heine et al. | | 384/119 |
| 2005/0104464 A1 * | 5/2005 | Fujii et al. | | 310/90 |
| 2005/0163404 A1 * | 7/2005 | Shishido et al. | | 384/100 |
| 2005/0190998 A1 * | 9/2005 | Neumann | | 384/119 |
| 2006/0097592 A1 * | 5/2006 | Sumi | | 310/90 |
| 2007/0237439 A1 * | 10/2007 | Watai et al. | | 384/420 |

FOREIGN PATENT DOCUMENTS

JP 2005-069382 3/2005

* cited by examiner

*Primary Examiner* — Quyen Leung
*Assistant Examiner* — Terrance Kenerly
(74) *Attorney, Agent, or Firm* — SNR Denton US LLP

(57) ABSTRACT

Disclosed herein is a bearing unit including a shaft; a radial bearing for supporting the outer circumferential surface of the shaft; a housing for accommodating the radial bearing, the housing having an open end from which the shaft is inserted and a closed end opposite to the open end in the axial direction of the shaft; a lubricating oil filled in the housing to reduce rotational friction of the shaft; a holding member provided at the open end of the housing for holding the lubricating oil; and a sealing member for closing the open end of the housing to prevent the leakage of the lubricating oil; wherein the sealing member having a side wall portion interposed between the holding member and the shaft and opposed to the outer circumferential surface of the shaft.

10 Claims, 7 Drawing Sheets

BEARING UNIT, MOTOR USING THE BEARING UNIT, AND ELECTRONIC EQUIPMENT USING THE MOTOR

CROSS REFERENCES TO RELATED APPLICATIONS

The present invention contains subject matter related to Japanese Patent Application JP 2007-231843 filed in the Japan Patent Office on Sep. 6, 2007, the entire contents of which being incorporated herein by reference.

BACKGROUND OF THE INVENTION

1. Field of the Invention

The present invention relates to a bearing unit for rotatably supporting a rotating shaft or rotatably supporting a rotating member to a shaft, motor using the bearing unit and electronic equipment using the motor.

2. Description of the Related Art

As a bearing unit for rotatably supporting a rotating shaft, the configuration shown in FIG. 9 is widely used (see Japanese Patent Laid-Open No. 2005-69382). Referring to FIG. 9, such a bearing unit 100 is generally shown. The bearing unit 100 has a rotating shaft 101, a radial bearing 102 for rotatably supporting the outer circumferential surface of the rotating shaft 101, a thrust bearing 103 for rotatably supporting the front end of the rotating shaft 101, a housing 104 for accommodating the radial bearing 102, and an oil seal 105 for preventing the leakage of a lubricating oil filled in the housing 104.

The housing 104 has a cylindrical shape having an open end from which the rotating shaft 101 is inserted and a closed end at which the thrust bearing 103 is provided. The radial bearing 102 is provided in the housing 104 at an intermediate portion between the open end and the closed end, and the oil seal 105 is provided at the open end of the housing 104.

The rotating shaft 101 is inserted through the radial bearing 102, and the lubricating oil is filled between the rotating shaft 101 and the radial bearing 102. Thus, the radial bearing 102 is provided by a hydrodynamic lubrication bearing having dynamic pressure generating grooves for generating a dynamic pressure by circulating the lubricating oil during rotation of the rotating shaft 101. The radial bearing 102 is formed of sintered metal containing copper or copper-iron as a main component, for example. The sintered metal has a porous structure as an inherent property, and this porous structure is utilized to hold the lubricating oil.

The outer circumferential surface of the radial bearing 102 is formed with a groove extending in the axial direction of the radial bearing 102. This groove provides a communication passage 106 defined between the outer circumferential surface of the radial bearing 102 and the inner circumferential surface of the housing 104. The communication passage 106 extends so as to make the communication between the closed end and the open end of the housing 104, thereby short-circuiting a dynamic pressure generated by the rotation of the rotating shaft 101. Accordingly, the expansion of air present in the housing 104 due to the generation of the dynamic pressure can be prevented to thereby prevent the scattering of the lubricating oil from the open end of the housing 104.

The oil seal 105 is mounted on an end surface at the open end of the housing 104 to prevent the leakage of the lubricating oil filled in the housing 104. The oil seal 105 is formed of metal or resin material, and it has an annular shape as having a shaft insertion hole 105a. The oil seal 105 is fitted to the open end of the housing 104 so as to come into abutment against an end surface of the radial bearing 102 exposed to the open end of the housing 104. Further, the rotating shaft 101 is inserted through the shaft insertion hole 105a of the oil seal 105 with a slight clearance defined therebetween. The surface of the oil seal 105 is treated by an oil repellent finish such that fluororesin is coated and baked, whereby a contact angle between the surface of the oil seal 105 and the lubricating oil filled in the housing 104 can be increased to thereby prevent the leakage of the lubricating oil. In the case that the oil seal 105 is formed of resin material, the mounted portion of the oil seal 105 to the housing 104 is sealed by welding such as thermal welding or ultrasonic welding.

In the bearing unit 100, a gap 110 is defined between the outer circumferential surface of the rotating shaft 101 and the inner circumferential surface of the oil seal 105 forming the shaft insertion hole 105a, and merely the gap 110 becomes a possible leak path of the lubricating oil filled in the housing 104. However, the width of the gap 110 is reduced to thereby utilize a surface tension of the lubricating oil exposed to the gap 110, thereby preventing the leakage of the lubricating oil from the gap 110 to the outside of the housing 104.

Further, the outer circumferential surface of the rotating shaft 101 opposed to the inner circumferential surface of the oil seal 105 forming the shaft insertion hole 105a is tapered toward the open end of the housing 104 as shown by reference numeral 101a. By the formation of the tapered portion 101a, a pressure gradient is formed in the gap 110 defined between the tapering outer circumferential surface of the rotating shaft 101 and the inner circumferential surface of the oil seal 105 forming the shaft insertion hole 105a. Accordingly, a force of drawing the lubricating oil from the gap 110 into the housing 104 is generated by a centrifugal force generated by the rotation of the rotating shaft 101. Thus, during rotation of the rotating shaft 101, the lubricating oil is drawn into the housing 104, so that the lubricating oil can be reliably supplied to the dynamic pressure generating grooves formed on the radial bearing 102 as a hydrodynamic lubrication bearing to thereby realize stable bearing of the rotating shaft 101 during rotation and to also prevent the leakage of the lubricating oil filled in the housing 104.

SUMMARY OF THE INVENTION

In constructing the bearing unit 100 shown in FIG. 9, the rotating shaft 101 is first inserted through the radial bearing 102 at a predetermined position. Thereafter, the inside of the housing 104 is evacuated to remove the air present in the housing 104, and the lubricating oil is then supplied to the housing 104 to thereby fill the pores formed in the radial bearing 102 and the spacing between the radial bearing 102 and the rotating shaft 101. As another method, the radial bearing 102 preliminarily impregnated with a lubricating oil is set in the housing 104. Thereafter, a desired amount of lubricating oil is supplied to the housing 104 by dripping, and the rotating shaft 101 is finally inserted through the radial bearing 102.

However, in any case, a small amount of air remains in the housing 104, for example, in the pores of the radial bearing 102 or in the communication passage 106.

This remaining air expands due to a temperature rise, a decrease in ambient atmospheric pressure, or a decrease in static pressure in the housing 104 by the rotation of the rotating shaft 101, causing the leakage of the lubricating oil filled in the housing 104 from the gap 110. As a result, a decrease in amount of the lubricating oil due to the expansion of the remaining air becomes greater than a loss due to evaporation, thus shortening the life of a product using the bearing unit 100.

There is a case that the open end of the housing 104 is directed downward according to the use condition of a product using the bearing unit 100. In this case, the lubricating oil moves under its own weight toward the open end of the housing 104, causing an increase in possibility of the leakage of the lubricating oil. Further, when the temperature of the product rises, the viscosity of the lubricating oil decreases to cause a further increase in possibility of the leakage of the lubricating oil.

It is accordingly an aim of the embodiment of the present invention to provide a bearing unit which can prevent a decrease in amount of a lubricating oil as a viscous fluid filled in the housing due to the expansion of air remaining in the housing or dissolved air generated by a decrease in static pressure in the housing and can therefore prevent an increase in rotational friction of the rotating shaft due to the decrease in amount of the lubricating oil.

It is another aim of the embodiment of the present invention to provide a motor using the above bearing unit.

It is a further aim of the embodiment of the present invention to provide electronic equipment using the above motor.

In accordance with a mode of the present invention, there is provided a bearing unit including a shaft; a radial bearing for supporting the outer circumferential surface of the shaft; a housing for accommodating the radial bearing, the housing having an open end from which the shaft is inserted and a closed end opposite to the open end in the axial direction of the shaft; a lubricating oil filled in the housing to reduce rotational friction of the shaft; a holding member provided at the open end of the housing for holding the lubricating oil; and a sealing member for closing the open end of the housing to prevent the leakage of the lubricating oil; the sealing member having a side wall portion interposed between the holding member and the shaft and opposed to the outer circumferential surface of the shaft.

In accordance with another mode of the present invention, there is provided a motor having a rotor, a stator, and a bearing unit for rotatably supporting the rotor to the stator, wherein the bearing unit includes a shaft; a radial bearing for supporting the outer circumferential surface of the shaft; a housing for accommodating the radial bearing, the housing having an open end from which the shaft is inserted and a closed end opposite to the open end in the axial direction of the shaft; a lubricating oil filled in the housing to reduce rotational friction of the shaft; a holding member provided at the open end of the housing for holding the lubricating oil; and a sealing member for closing the open end of the housing to prevent the leakage of the lubricating oil; the sealing member having a side wall portion interposed between the holding member and the shaft and opposed to the outer circumferential surface of the shaft.

In accordance with a further mode of the present invention, there is provided electronic equipment including a motor having a rotor, a stator, and a bearing unit for rotatably supporting the rotor to the stator, wherein the bearing unit includes a shaft; a radial bearing for supporting the outer circumferential surface of the shaft; a housing for accommodating the radial bearing, the housing having an open end from which the shaft is inserted and a closed end opposite to the open end in the axial direction of the shaft; a lubricating oil filled in the housing to reduce rotational friction of the shaft; a holding member provided at the open end of the housing for holding the lubricating oil; and a sealing member for closing the open end of the housing to prevent the leakage of the lubricating oil; the sealing member having a side wall portion interposed between the holding member and the shaft and opposed to the outer circumferential surface of the shaft.

According to the embodiment of the present invention, the holding member holding the lubricating oil is provided at the open end of the housing, and the side wall portion of the sealing member is opposed to the outer circumferential surface of the shaft. Accordingly, the contact of the holding member and the shaft can be prevented and the evaporation of the lubricating oil from the open end of the housing can also be prevented. Furthermore, the amount of the lubricating oil filled in the housing can be increased by the holding member to thereby prevent a decrease in amount of the lubricating oil and to extend the life of the product.

Other aims and features of the embodiment of the invention will be more fully understood from the following detailed description and appended claims when taken with the accompanying drawings.

DETAILED DESCRIPTION OF THE PREFERRED EMBODIMENT

Figure 1:
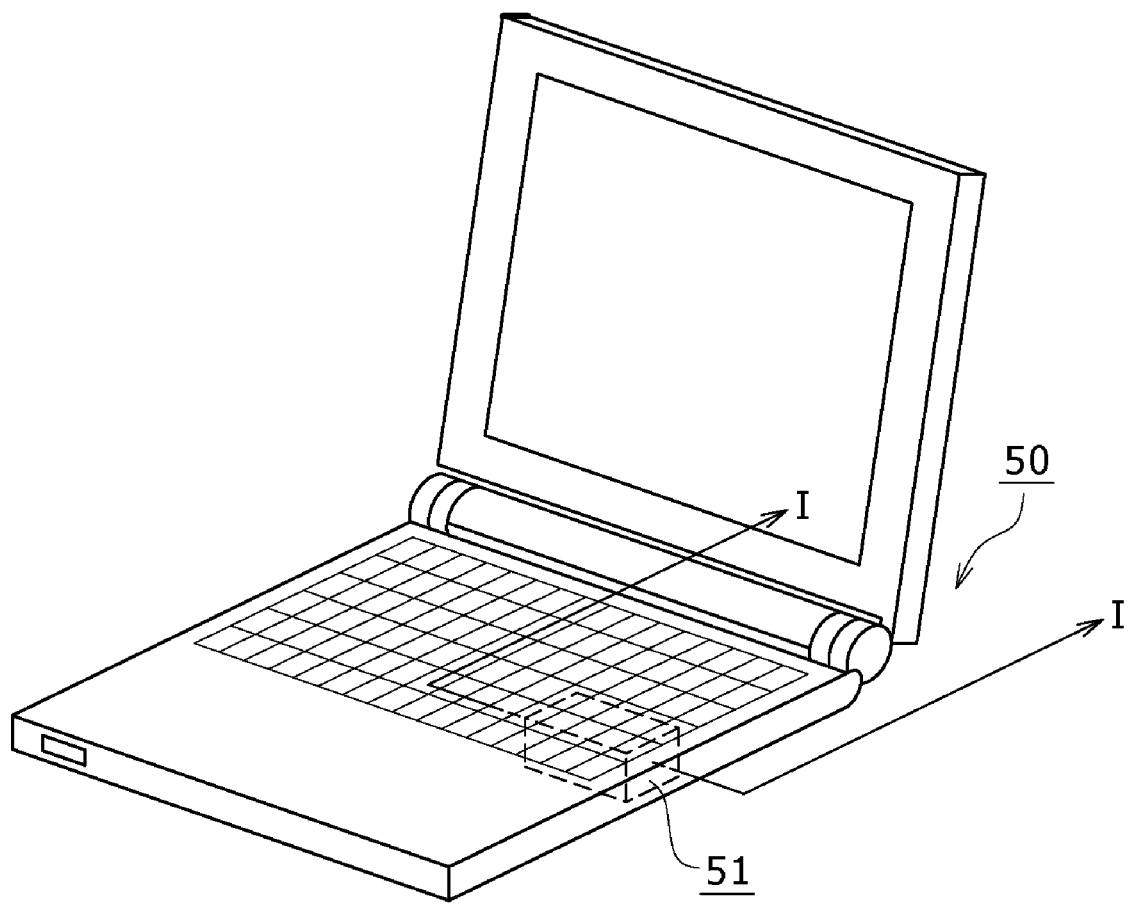
FIG. 1 is a perspective view of an example of electronic equipment including a motor using a bearing unit according to the embodiment of the present invention.
Figure 3:
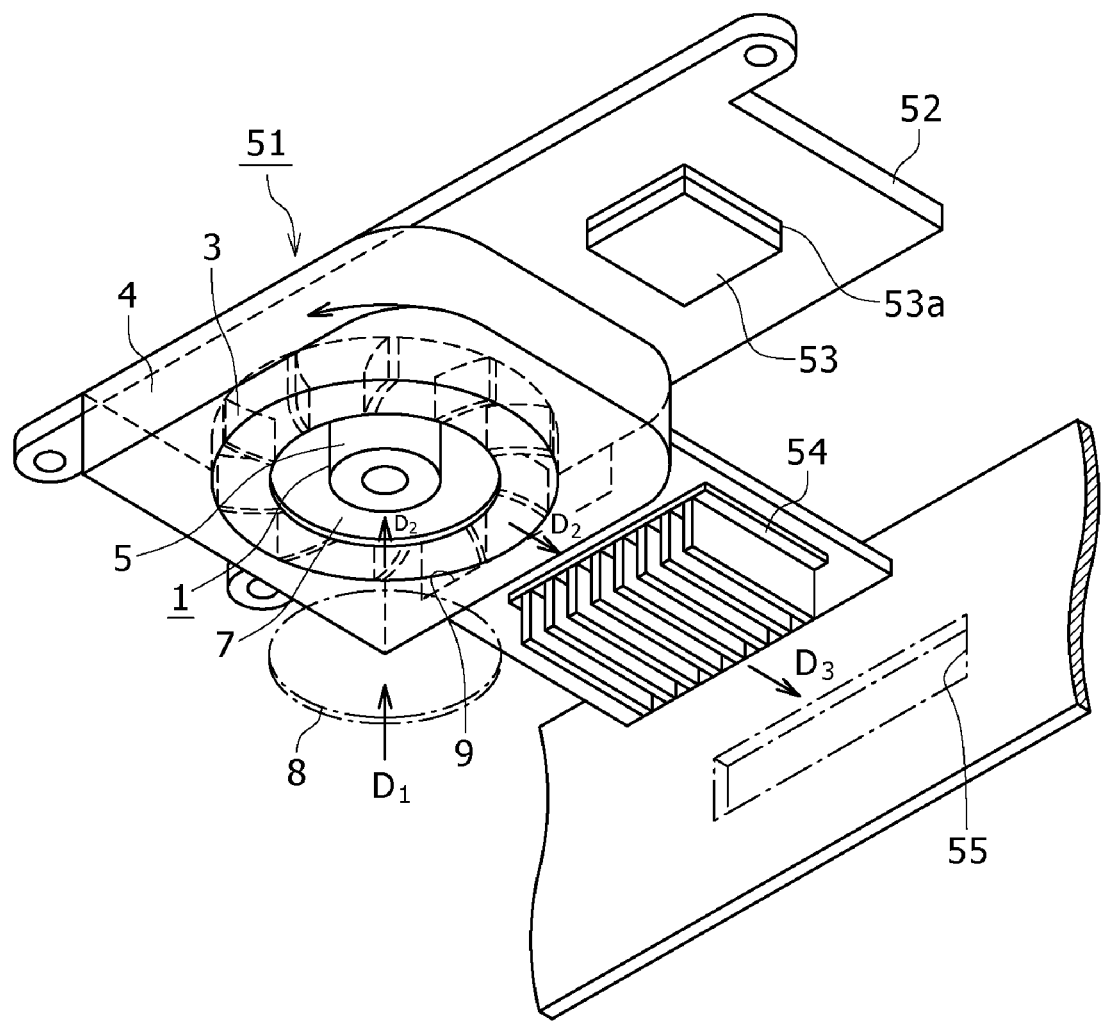
FIG. 3 is a perspective view of a radiating device shown in FIG. 2.

A motor using a bearing unit according to a preferred embodiment of the present invention will now be described with reference to the drawings. Referring to FIG. 1, there is shown a portable computer 50 as an information processing device for performing arithmetic computations on various kinds of information. The portable computer 50 is an example of electronic equipment. As shown in FIG. 1, the portable computer 50 includes a radiating device 51 using the motor according to the preferred embodiment. As shown in FIG. 3, the radiating device 51 has a metal base 52 mounted inside of a housing of the computer 50. Mounted on the metal base 52 are a heat generating element 53 such as a CPU (Central Processing Unit) electrically driven to generate heat, a heat sink 54, a motor 1 according to the embodiment of the present invention, a fan 3 rotationally driven by the motor 1, and a fan case 4 accommodating the fan 3. The motor 1 for rotationally driving the fan 3 in the radiating device 51 includes a bearing unit 5.

The base 52 has a substantially L-shaped configuration. The heat generating element 53 is mounted through a heat transfer seal 53a to the lower surface of the base 52 at one end portion thereof, and the heat sink 54 is mounted to the lower surface of the base 52 at the other end portion thereof. The heat sink 54 is a corrugated or finned heat sink, and it is formed of metal having superior heat dissipation, such as aluminum. In the condition where the base 52 is mounted in the housing of the computer 50, the heat sink 54 is opposed to a rectangular through hole 55 formed through a side wall of the housing of the computer 50 as shown in FIG. 3.

The motor 1 is mounted on a substantially central portion of the base 52, and the fan case 4 accommodating the fan 3 driven by the motor 1 is also mounted on the lower surface of the base 52 at the central portion thereof. The fan case 4 is formed with a circular air inlet hole 7 opening at a lower portion corresponding to a central portion of the fan 3. The bottom wall of the housing of the computer 50 is formed with a circular opening 8 opposed to the air inlet hole 7 of the fan case 4. Further, the fan case 4 is formed with an air outlet hole 9 for discharging the air sucked from the air inlet hole 7 by the fan 3 toward the heat sink 54.

Figure 2:
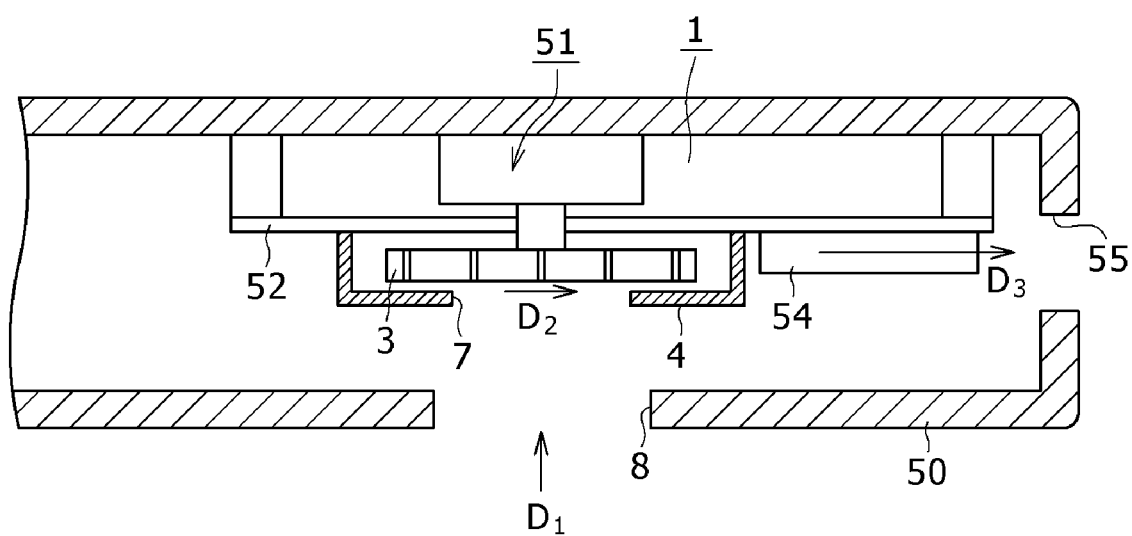
FIG. 2 is a cross section taken along the line I-I in FIG. 1.

The radiating device 51 is operated in the following manner. When the motor 1 is driven, the fan 3 is rotated by the motor 1 in the direction shown by an arrow R1 in FIG. 3. As a result, the outside air is sucked from the opening 8 in the direction shown by an arrow D1 in FIGS. 2 and 3 to enter the fan case 4 through the air inlet hole 7. Thereafter, the air sucked into the fan case 4 flows in the direction shown by an arrow D2 in FIGS. 2 and 3 and is discharged from the air outlet hole 9. Thereafter, the air flows through the heat sink 54 in the direction shown by an arrow D3, and is finally discharged from the through hole 55 to the outside of the housing of the computer 50.

The heat generated from the heat generating element 53 is transmitted through the base 52 formed of metal having superior heat dissipation to the heat sink 54 mounted on the base 52. On the other hand, the fan 3 is rotated by the motor 1 to suck the outside air from the opening 8 of the housing of the computer 50 through the air inlet hole 7 into the fan cover 4, and the air is discharged from the air outlet hole 9 to flow through the fins of the heat sink 54, thereby dissipating the heat from the heat sink 54 through the through hole 55 to the outside of the housing of the computer 50.

Figure 4:
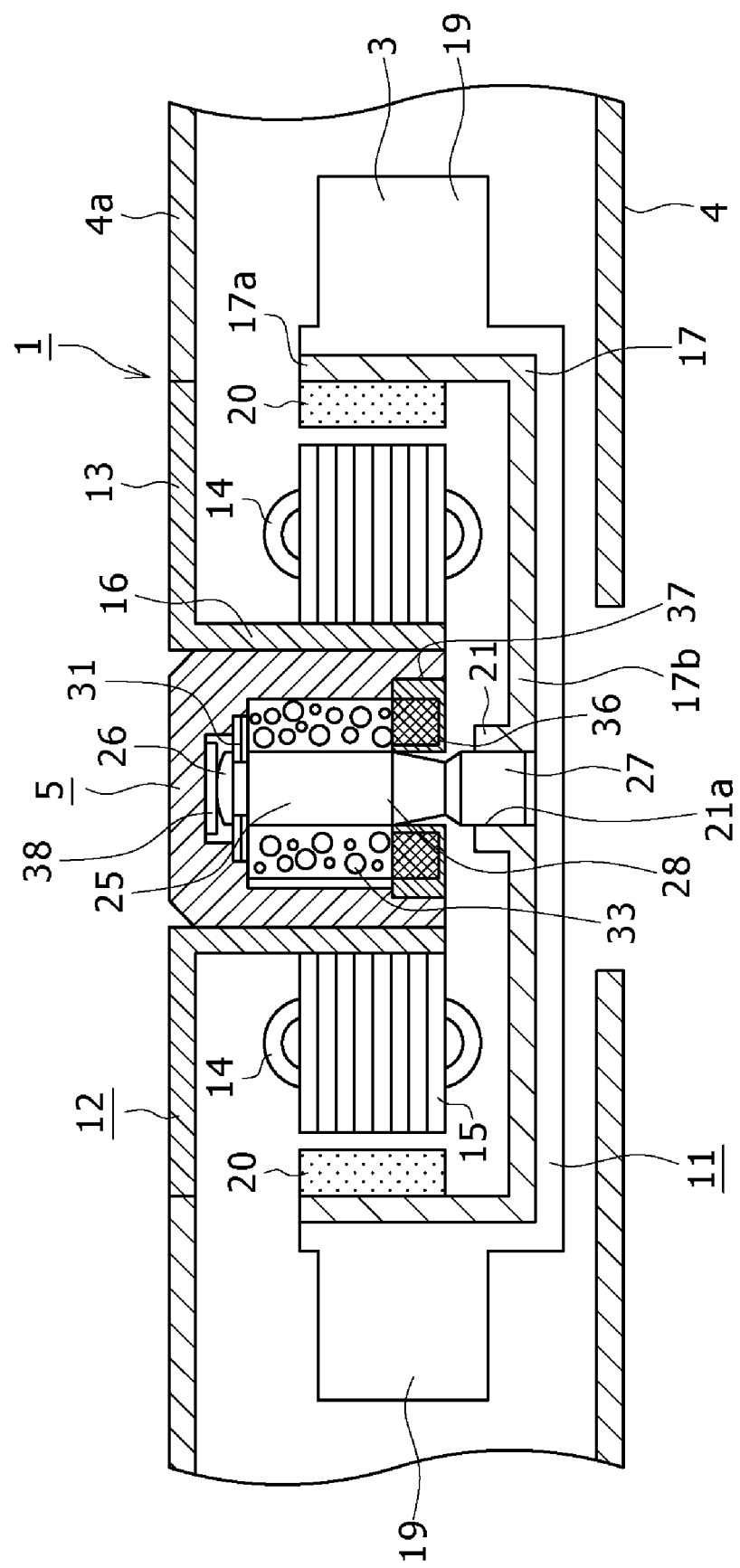
FIG. 4 is a sectional view of a motor using the bearing unit according to the embodiment of the present invention.

The motor 1 used in the radiating device 51 will now be described. As shown in FIG. 4, the motor 1 includes a rotor 11 and a stator 12. The stator 12 is integrated with an upper wall portion 4a of the fan case 4 accommodating the motor 1 and the fan 3. The stator 12 includes a stator yoke 13, the bearing unit 5 according to the embodiment of the present invention, a coil 14, and a core 15 around which the coil 14 is wound. The stator yoke 13 may be formed integrally with the upper wall portion 4a of the fan case 4, i.e., may be formed by a part of the fan case 4. Alternatively, the stator yoke may be formed independently of the fan case 4. The stator yoke 13 is formed of iron, for example. The stator yoke 13 has a cylindrical holder 16 at a central portion, and the bearing unit 5 is fixedly mounted in the holder of the stator yoke 13 by press fit and/or adhesion.

As shown in FIG. 4, the cylindrical holder 16 for holding the bearing unit 5 is integral with the stator yoke 13.

The core 15 is mounted on the outer circumference of the holder 16, and the coil 14 to which a driving current is supplied is wound around the core 15.

On the other hand, the rotor 11 is fixedly mounted on a rotating shaft 25 rotatably supported to the bearing unit 5. That is, the rotor 11 is rotated together with the rotating shaft 25. The rotor 11 includes a rotor yoke 17 and the fan 3 rotating with the rotor yoke 17. The fan 3 has a plurality of vanes 19 formed integrally with the rotor yoke 17 by outsert molding on the outer circumferential surface of the rotor yoke 17.

The rotor yoke 17 is a cylindrical member having a closed end in the vertical direction. That is, the rotor yoke 17 has a cylindrical portion 17a and a bottom plate portion 17b. A ringlike rotor magnet 20 is provided on the inner circumferential surface of the cylindrical portion 17a of the rotor yoke 17 so as to face the coil 14 of the stator 12. The rotor magnet 20 is a plastic magnet having a plurality of S poles and N poles alternately arranged in the circumferential direction. The rotor magnet 20 is fixed to the inner circumferential surface of the rotor yoke 17 by adhesive.

The bottom plate portion 17b of the rotor yoke 17 is formed with a central boss portion 21 for mounting the rotating shaft 25. The boss portion 21 has a through hole 21a, and a mounted portion 27 formed at the lower end of the rotating shaft 25 as viewed in FIG. 4 is press-fitted in the through hole 21a of the boss portion 21. Accordingly, the rotor yoke 17 is integrated with the rotating shaft 25, and the rotating shaft 25 is rotatably supported through the bearing unit 5 fixed to the stator 12.

When a driving current having a predetermined duty pattern is supplied from a driving circuit (not shown) provided outside of the motor 1 to the coil 14 of the stator 12, a magnetic field is generated from the coil 14 to cooperate with a magnetic field generated from the rotor magnet 20 of the rotor 11, thereby rotating the rotor 11 together with the rotating shaft 25. Accordingly, the fan 3 having the vanes 19 integrated with the rotor 11 is also rotated together with the rotor 11. By the rotation of the fan 3, the outside air is sucked from the opening 8 of the housing of the computer 50 through the air inlet hole 7 of the fan case 4 into the fan case 4. The air sucked into the fan case 4 is discharged from the air outlet hole 9 of the fan case 4 to flow through the heat sink 54, and the air is finally discharged from the through hole 55 of the housing of the computer 50 to the outside thereof. Thus, the heat generated from the heat generating element 53 is dissipated to the outside of the housing of the computer 50, thereby cooling the heat generating element 53 and the computer 50.

Figure 5:
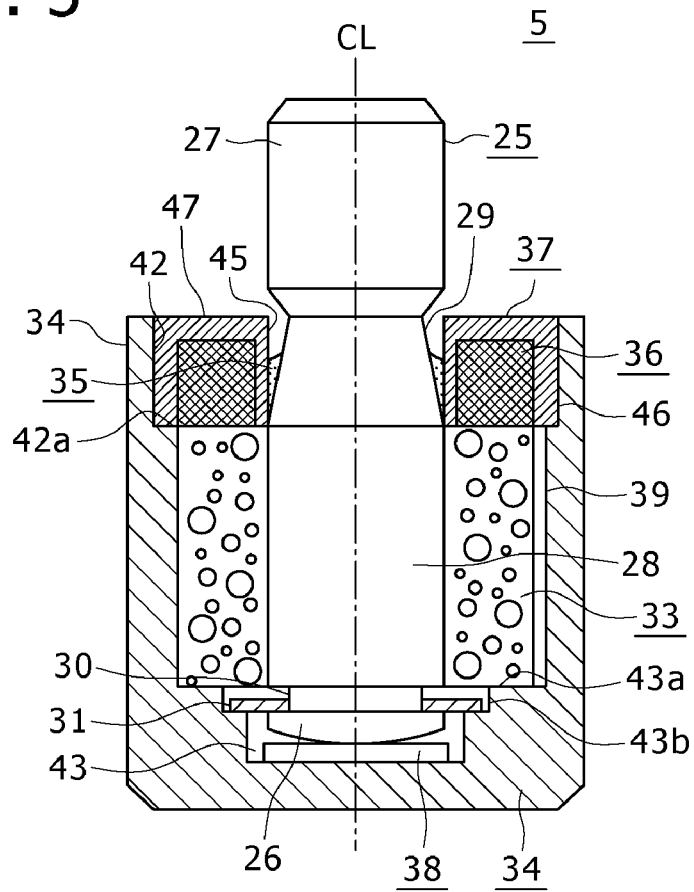
FIG. 5 is a sectional view of the bearing unit shown in FIG. 4.

The bearing unit 5 used in the motor 1 will now be described in detail. As shown in FIG. 5, the bearing unit 5 for rotatably supporting the rotor 11 of the motor 1 includes the rotating shaft 25 fixed to the rotor yoke 17, a radial bearing 33 for supporting the outer circumferential surface of the rotating shaft 25, a housing 34 for accommodating the radial bearing 33, the housing 34 having an open end from which the rotating shaft 25 is inserted and a closed end opposite to the open end in the axial direction of the rotating shaft 25, a lubricating oil 35 filled in the housing 34 to reduce rotational friction of the rotating shaft 25, a holding member 36 provided at the open end of the housing 34 for holding the lubricating oil 35, a sealing member 37 for closing the open end of the housing 34 to prevent the leakage of the lubricating oil 35, and a thrust bearing 38 for supporting the front end of the rotating shaft 25 (the lower end as viewed in FIG. 5) located at the closed end of the housing 34.

The front end of the rotating shaft 25 as one end of the rotating shaft 25 in the axial direction thereof as inserted into the radial bearing 33 has a spherical surface or a tapering surface to form a head portion 26 supported by the thrust bearing 38. The other end of the rotating shaft 25 is formed as the mounted portion 27 adapted to be mounted to the boss portion 21 of the rotor yoke 17. In the condition where the rotating shaft 25 is inserted through the radial bearing 33, the mounted portion 27 projects from an upper opening 42 of the housing 34 as viewed in FIG. 5, i.e., from the open end of the housing 34. The mounted portion 27 is then mounted to the boss portion 21 of the rotor yoke 17.

The rotating shaft 25 further has a body portion 28 between the head portion 26 and the mounted portion 27. The body portion 28 is rotatably supported by the radial bearing 33. Further, a tapering portion 29 is formed between the mounted portion 27 and the body portion 28 so as to be tapered toward the mounted portion 27. The body portion 28 has a height (axial length) substantially equal to the height of the radial bearing 33 in the axial direction thereof, and has an outer diameter substantially equal to the inner diameter of the radial bearing 33.

In the condition where the rotating shaft 25 is inserted through the radial bearing 33, the tapering portion 29 of the rotating shaft 25 is opposed to an inner wall portion 45 of the sealing member 37 with a predetermined clearance C defined therebetween as described later. The tapering portion 29 has a diameter gradually decreasing from the body portion 28 side to the mounted portion 27 side. Accordingly, the clearance C defined between the tapering portion 29 of the rotating shaft 25 and the inner wall portion 45 of the sealing member 37 gradually increases from the body portion 28 side to the mounted portion 27 side. As a result, a pressure gradient is formed in the clearance C to generate a force of drawing the lubricating oil 35 into the housing 34. Accordingly, during rotation of the rotating shaft 25, the lubricating oil 35 in the clearance C is drawn into the housing 34, so that the lubricating oil 35 can be reliably supplied to dynamic pressure generating grooves 40 and 41 of the radial bearing 33 formed as a hydrodynamic lubricating bearing, thereby generating a dynamic pressure. As a result, the rotating shaft 25 can be stably supported by the radial bearing 33, and the leakage of the lubricating oil 35 from the upper opening 42 as the open end of the housing 34 can be prevented.

Thus, the lubricating oil 35 is adapted to be supplied to the dynamic pressure generating grooves 40 and 41 of the radial bearing 33 as a hydrodynamic lubrication bearing in the bearing unit 5, thereby generating a dynamic pressure. The radial bearing 33 is formed of sintered metal, and it is impregnated with the lubricating oil 35 filled in the housing 34. The lubricating oil 35 filled in the housing 34 is exposed to the clearance C defined between the tapering portion 29 of the rotating shaft 25 and the inner wall portion 45 of the sealing member 37.

The rotating shaft 25 is formed with a circumferential groove 30 between the head portion 26 and the body portion 28, so as to prevent the drop of the rotating shaft 25 from the radial bearing 33. The groove 30 is formed on the outer circumferential surface of the rotating shaft 25 so as to extend in the circumferential direction thereof. When the rotating shaft 25 is inserted through the radial bearing 33, the groove 30 of the rotating shaft 25 comes into engagement with a ring 31 preliminarily provided in the housing 34, thereby preventing the drop of the rotating shaft 25 from the radial bearing 33. The ring 31 is set on a shoulder 43b formed at a bottom closed portion 43 of the housing 34 as viewed in FIG. 5. The ring 31 is formed with an insertion hole having a diameter smaller than the diameter of the body portion 28 of the rotating shaft 25 and slightly larger than the diameter of a neck portion where the groove 30 is formed. The head portion 26 of the rotating shaft 25 is inserted through the insertion hole of the ring 31, and the groove 30 of the rotating shaft 25 is engaged with the ring 31. The ring 31 is formed of polymeric material such as nylon, polyamide, and polyimide or metal such as stainless steel and phosphor bronze.

The radial bearing 33 is formed of sintered metal containing copper or copper-iron as a main component, for example. The sinered metal has a porous structure as an inherent property. By utilizing this property, the lubricating oil 35 as a viscous fluid filled in the housing 34 is held in the radial bearing 33. The radial bearing 33 may be formed of brass, stainless steel, or polymeric material. The radial bearing 33 and the lubricating oil 35 impregnated in the radial bearing 33 constitute a hydrodynamic lubrication bearing, and the dynamic pressure generating grooves 40 and 41 are formed on the inner circumferential surface of the radial bearing 33 through which the rotating shaft 25 is inserted.

Figure 6:
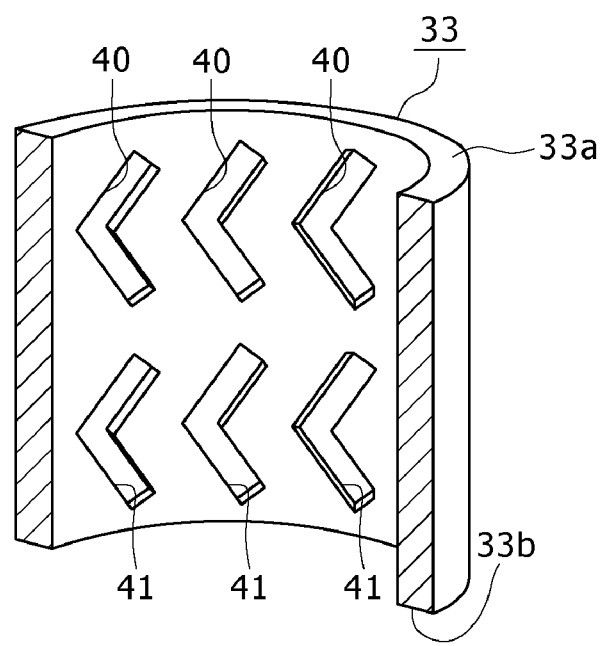
FIG. 6 is a perspective view showing dynamic pressure generating grooves formed on the inner circumferential surface of a radial bearing in the bearing unit shown in FIG. 5.

As shown in FIG. 6, the dynamic pressure generating grooves 40 and 41 are formed on the inner circumferential surface of the radial bearing 33 so as to be arranged in the circumferential direction of the radial bearing 33 in such a manner that each of the grooves 40 and 41 has a V-shape. More specifically, the V-shaped grooves 40 and 41 are so arranged as to be pointed in the rotational direction shown by an arrow R2 in FIG. 6. As shown in FIG. 6, the grooves 40 and 41 are respectively formed on the upper and lower sides in the axial direction of the cylindrical radial bearing 33. More specifically, the grooves 40 are formed on the upper side near the open end of the housing 34, and the grooves 41 are formed on the lower side near the closed end of the housing 34, i.e., near the thrust bearing 38. The number, size, etc. of the dynamic pressure generating grooves 40 and 41 may be suitably set according to the diameter, axial length, etc. of the radial bearing 33.

When the rotating shaft 25 inserted through the radial bearing 33 as a hydrodynamic lubrication bearing is rotated about its center line CL in the direction R2 shown in FIG. 6, the lubricating oil 35 filled in the housing 34 flows in the dynamic pressure generating grooves 40 and 41 formed on the inner circumferential surface of the radial bearing 33, thereby generating a dynamic pressure between the outer circumferential surface of the rotating shaft 25 and the inner circumferential surface of the radial bearing 33 to support the rotating shaft 25 rotating in the radial bearing 33. The dynamic pressure generated above functions to greatly reduce a coefficient of friction between the rotating shaft 25 and the radial bearing 33, thus realizing smooth rotation of the rotating shaft 25.

Figure 7:
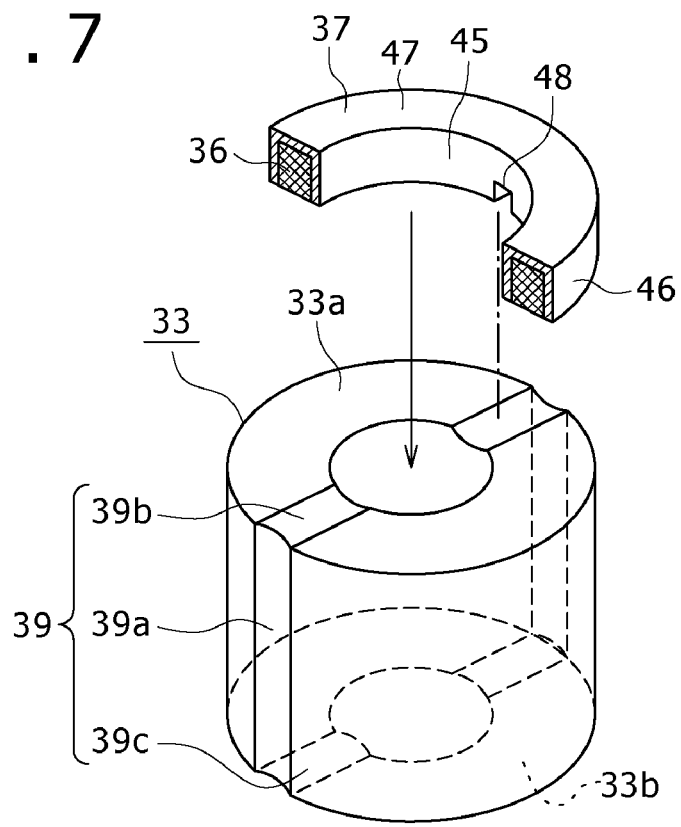
FIG. 7 is a perspective view showing the form of a communication groove formed on the outer surface of the radial bearing.

As shown in FIG. 7, the radial bearing 33 has a communication groove 39 for short-circuiting the dynamic pressure generated in the housing 34. That is, the communication groove 39 is formed on the outer surface of the radial bearing 33 to define a communication passage between the outer surface of the radial bearing 33 and the inner surface of the housing 34. The communication groove 39 is composed of a vertical groove 39a formed on the outer circumferential surface of the radial bearing 33 so as to extend in the axial direction thereof, an upper horizontal groove 39b formed on the upper end surface 33a of the radial bearing 33 so as to be connected to the upper end of the vertical groove 39a, and a lower horizontal groove 39c formed on the lower end surface 33b of the radial bearing 33 so as to be connected to the lower end of the vertical groove 39a. In the condition where the radial bearing 33 is accommodated in the housing 34 as shown in FIG. 5, the upper opening 42 and the bottom closed portion 43 of the housing 34 are kept in communication with each other through the communication groove 39.

By the formation of the communication groove 39, it is possible to prevent the expansion of air remaining in the housing 34 due to the generation of a dynamic pressure and a reduction in static pressure during rotation of the rotating shaft 25, and it is accordingly possible to prevent the leakage of the lubricating oil 35 due to such expansion of air. That is, the upper opening 42 and the bottom closed portion 43 of the housing 34 are brought into communication with each other through the communication groove 39, thereby short-circuiting the dynamic pressure generated in the housing 34 to prevent a reduction in static pressure. Accordingly, it is possible to suppress the expansion of air remaining in the housing 34 and the generation of air dissolved in the lubricating oil 35, thereby preventing the leakage of the lubricating oil 35.

As described above, the housing 34 for accommodating the radial bearing 33 has a cylindrical shape closed at one end in the axial direction. That is, the housing 34 has the upper opening 42 as an open end for insertion of the rotating shaft 25 and the bottom closed portion 43 in which the thrust bearing 38 is located. In the condition where the radial bearing 33 is accommodated in the housing 34, the upper end surface 33a of the radial bearing 33 is exposed to the upper opening 42, and the rotating shaft 25 is inserted through the radial bearing 33.

The upper opening 42 of the housing 34 is formed with an upper shoulder 42a extending in the circumferential direction of the housing 34. As described later, the holding member 36 and the sealing member 37 are supported to the upper shoulder 42a of the housing 34.

The bottom closed portion 43 of the housing 34 is formed with a first lower shoulder 43a and a second lower shoulder 43b both extending in the circumferential direction of the housing 34. In the condition where the radial bearing 33 is accommodated in the housing 34, the lower end surface 33b of the radial bearing 33 abuts against the first lower shoulder 43a of the housing 34. The second lower shoulder 43b is formed radially inside of the first lower shoulder 43a, and the ring 31 fitted to the rotating shaft 25 around the circumferential groove 30 thereof is supported to the second lower shoulder 43b of the housing 34.

The thrust bearing 38 for rotatably supporting the head portion 26 formed at one axial end (lower end as viewed in FIG. 5) of the rotating shaft 25 supported to the radial bearing 33 is formed integrally with the bottom closed portion 43 of the housing 34 at a radially central portion thereof. The thrust bearing 38 is formed by resin molding of the housing 34. The thrust bearing 38 is formed as a pivot bearing for supporting at one point the head portion 26 having a spherical surface of a tapering surface. The thrust bearing 38 may be formed as a separate member of the same material as that of the housing 34 or of a different material. In this case, the thrust bearing 38 may be attached to the bottom closed portion 43.

The holding member 36 for holding the lubricating oil 35 will now be described. The holding member 36 is provided at the open end of the housing 34 and functions to hold the lubricating oil 35, thereby supplying the lubricating oil 35 to the radial bearing 33 when the lubricating oil 35 impregnated in the radial bearing 33 is decreased. The holding member 36 is formed of any material capable of holding the lubricating oil 35 as a viscous fluid, for example, a porous elastic material such as felt, sponge, or rubber.

The holding member 36 is fitted in the sealing member 37, and the sealing member 37 is fitted in the housing 34 at the upper opening 42. Thus, the assembly of the holding member 36 and the sealing member 37 is brought into close contact with the upper end surface 33a of the radial bearing 33 at the open end of the housing 34. The porous structure of the holding member 36 has pores larger in size than those of the porous structure of the radial bearing 33, so that the capillary force of the holding member 36 is smaller than that of the radial bearing 33. Accordingly, when the holding member 36 impregnated with the lubricating oil 35 is brought into close contact with the radial bearing 33 impregnated with the lubricating oil 35, the lubricating oil 35 in the holding member 36 is drawn into the radial bearing 33 by a difference in capillary force between the holding member 36 and the radial bearing 33. Thus, the lubricating oil 35 can be supplied from the holding member 36 to the radial bearing 33.

The holding member 36 has an annular shape according to the shape of the radial bearing 33. The holding member 36 is covered with the sealing member 37 except the lower surface brought into close contact with the upper end surface 33a of the radial bearing 33. In the condition where the lower surface of the holding member 36 is brought into close contact with the upper end surface 33a of the radial bearing 33, the inner circumferential surface of the holding member 36 is opposed to the outer circumferential surface of the rotating shaft 25 inserted through the radial bearing 33. However, the sealing member 37 is interposed between the holding member 36 and the rotating shaft 25 to thereby prevent that the fibers disentangled from the holding member 36 may come into contact with the rotating shaft 25. Accordingly, the rotation of the rotating shaft 25 is not hindered by the catch of the fibers disentangled from the holding member 36.

In the condition where the lower surface of the holding member 36 is brought into close contact with the upper end surface 33a of the radial bearing 33, the lower surface of the holding member 36 faces the upper horizontal groove 39b formed on the upper end surface 33a of the radial bearing 33.

The sealing member 37 is formed of a resin material such as polybutylene terephthalate (PBT) or a metal material. The sealing member 37 has an annular shape having an outer diameter such that the outer circumferential surface of the sealing member 37 is engaged with the upper opening 42 of the housing 34. The sealing member 37 has a substantially sectional U-shaped configuration composed of an inner wall portion 45, an outer wall portion 46, and an upper wall portion 47 (as viewed in FIG. 5). In the condition where the assembly of the sealing member 37 and the holding member 36 is fitted in the housing 34, the inner wall portion 45 of the sealing member 37 is opposed to the outer circumferential surface of the rotating shaft 25 inserted through the radial bearing 33. The outer wall portion 46 is formed radially outside of the inner wall portion 45 and engaged with the inner circumferential surface of the housing 34 at the upper opening 42. The upper wall portion 47 is so formed as to connect the upper end of the inner wall portion 45 and the upper end of the outer wall portion 46.

The holding member 36 is fitted into the sealing member 37 from its lower opening opposite to the upper wall portion 47, thus integrating the holding member 36 and the sealing member 37. The assembly of the holding member 36 and the sealing member 37 is fitted to the upper opening 42 of the housing 34 in the condition where the lower surface of this assembly is opposed to the upper end surface 33a of the radial bearing 33.

When the sealing member 37 is press-fitted to the upper opening 42 of the housing 34, the outer wall portion 46 of the sealing member 37 comes into abutment against the upper shoulder 42a of the upper opening 42. In this condition, the upper wall portion 47 of the sealing member 37 becomes substantially flush with the upper end surface of the housing 34. The sealing member 37 formed of resin is integrated with the housing 34 formed of resin by thermal welding or ultrasonic welding. The upper surface and the inner and outer circumferential surfaces of the holding member 36 are respectively supported by the upper wall portion 47 and the inner and outer wall portions 45 and 46 of the sealing member 37. Accordingly, there is no possibility that the lubricating oil 35 held by the holding member 36 may leak to the upper wall portion 47 side, so that the welding of the sealing member 37 to the housing 34 can be performed without any trouble. Further, by welding the sealing member 37 to the housing 34, the mechanical strength of the bearing unit 5 can be improved.

As described above, in the condition where the assembly of the holding member 36 and the sealing member 37 is fitted in the housing 34, the inner wall portion 45 of the sealing member 37 is interposed between the holding member 36 and the rotating shaft 25 to shield the holding member 36 from the rotating shaft 25. Accordingly, the contact of the holding member 36 and the rotating shaft 25 can be prevented by the sealing member 37. Further, even when the fibers of the holding member 36 are disentangled, it is possible to prevent that the fibers disentangled from the holding member 36 may be caught by the rotating shaft 25 during rotation thereof.

The inner circumferential surface, the outer circumferential surface, and the upper surface of the holding member 36 are respectively covered with the inner wall portion 45, the outer wall portion 46, and the upper wall portion 47 of the sealing member 37, and the uncovered lower surface of the holding member 36 is in close contact with the upper end surface 33a of the radial bearing 33. Accordingly, the air contact area of the holding member 36 impregnated with the lubricating oil 35 can be minimized to thereby prevent an evaporation loss of the lubricating oil 35 from the holding member 36. Further, since the holding member 36 is fitted in the sealing member 37 except the lower surface contacting with the upper end surface 33a of the radial bearing 33, the leakage of the lubricating oil 35 from the holding member 36 to the outside of the housing 34 can be prevented.

Each of the inner and outer wall portions 45 and 46 of the sealing member 37 has a height slightly smaller than that of the holding member 36. Accordingly, in the condition where the holding member 36 is fitted in the sealing member 37, the holding member 36 slightly projects from the lower open end of the sealing member 37. When the sealing member 37 is press-fitted to the upper opening 42 of the housing 34, the holding member 36 slightly projecting from the lower open end of the sealing member 37 is elastically pressed on the upper end surface 33a of the radial bearing 33, thus coming into close contact with the radial bearing 33. Accordingly, the lubricating oil 35 impregnated in the holding member 36 can be effectively supplied to the radial bearing 33 having a porous structure. Further, since the holding member 36 is closely fitted to the radial bearing 33 and the sealing member 37, a change in volume of the holding member 36 due to an influence of use environment etc. or due to aging can be prevented.

Figure 8:
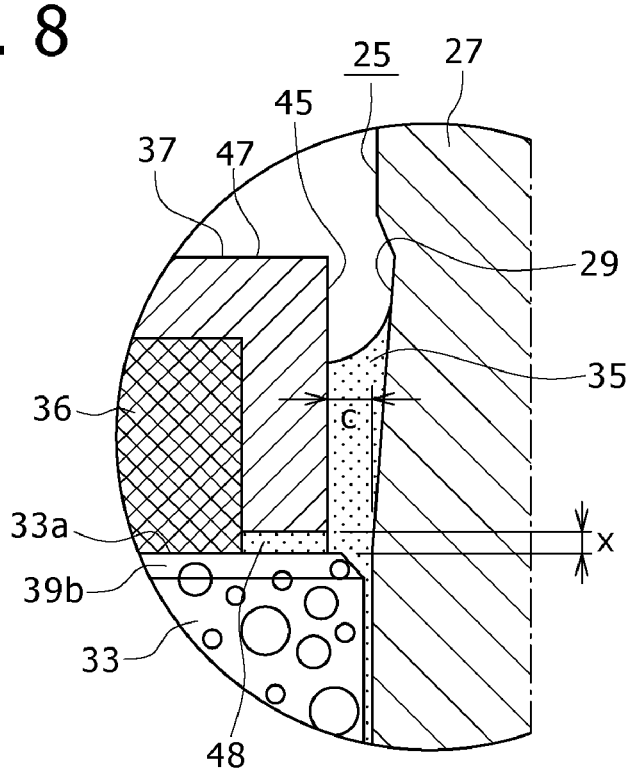
FIG. 8 is an enlarged sectional view showing a clearance defined between a sealing member and a rotating shaft and a gap defined between the sealing member and the radial bearing.
Figure 9:
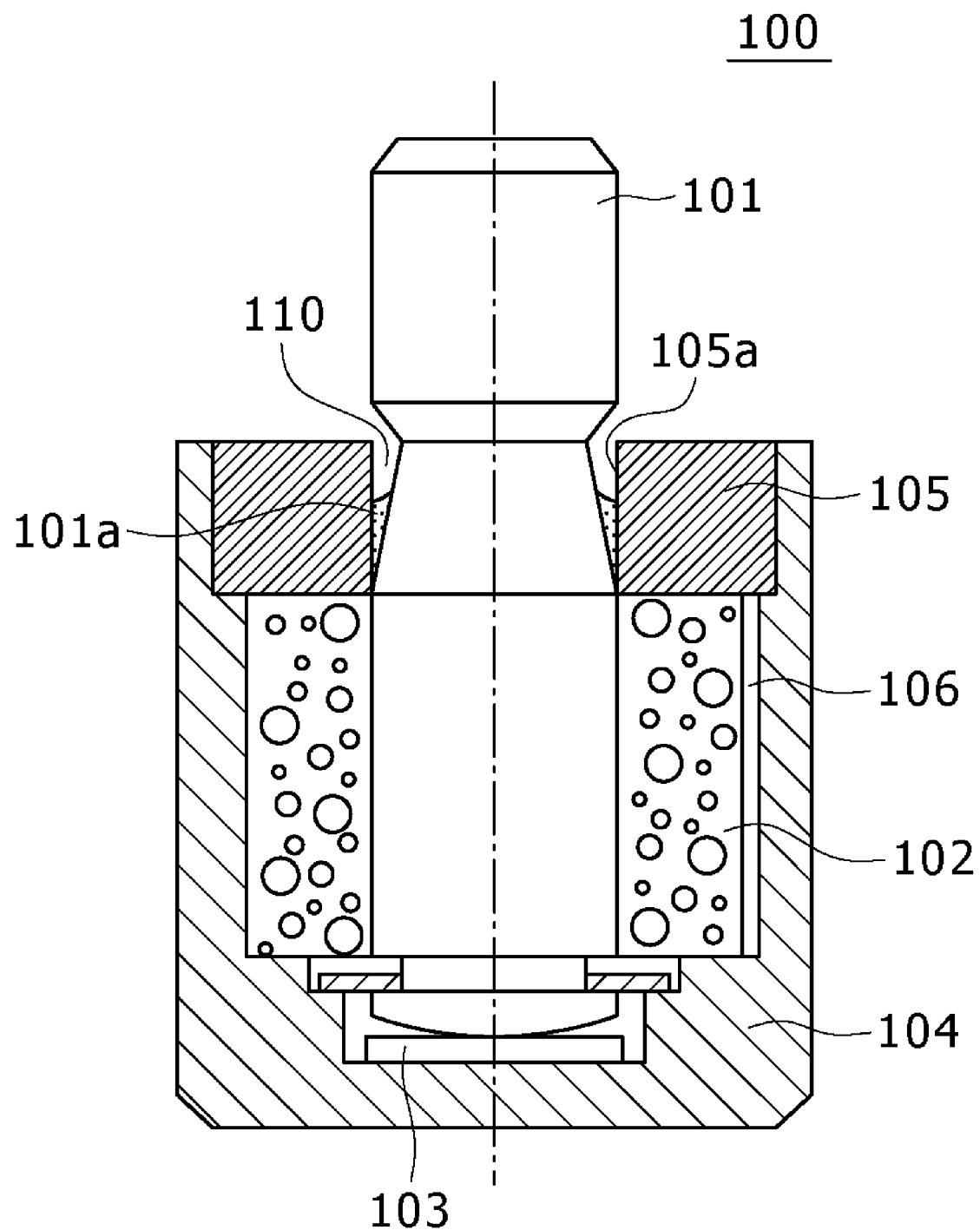
FIG. 9 is a sectional view of a bearing unit in the related art.

As shown in FIG. 8, the sealing member 37 has a communication gap 48 between the lower end of the inner wall portion 45 and the upper end surface 33a of the radial bearing 33, so that the holding member 36 is brought into communication with the clearance C through the communication gap 48, wherein the clearance C is defined between the inner wall portion 45 of the sealing member 37 and the tapering portion 29 of the rotating shaft 25. More specifically, the communication gap 48 is provided by a cutout or recess formed on the lower end of the inner wall portion 45 of the sealing member 37. The lower open end of this cutout is closed by the upper end surface 33a of the radial bearing 33 in the condition where the outer wall portion 46 of the sealing member 37 abuts against the shoulder 42a of the upper opening 42 of the housing 34 or the upper wall portion 47 of the sealing member 37 is welded to the housing 34, thus positioning the sealing member 37 in the housing 34. In other words, when the sealing member 37 is positioned in the housing 34, the communication gap 48 is defined between the upper end surface 33a of the radial bearing 33 and the inner wall portion 45 of the sealing member 37. While the communication gap 48 is provided by the single cutout in this preferred embodiment, a plurality of cutouts may be intermittently formed on the lower end of the inner wall portion 45 in the circumferential direction of the sealing member 37 or may be continuously formed on the lower end of the inner wall portion 45 over the entire circumference thereof.

The communication gap 48 has a width X between the bottom of the recess formed on the lower end of the inner wall portion 45 and the upper end surface 33a of the radial bearing 33. The width X of the communication gap 48 is set smaller than the minimum width of the clearance C, so that the lubricating oil 35 present in the clearance C can be drawn into the communication gap 48 by a capillary force. Accordingly, the lubricating oil 35 filled in the housing 34 and impregnated in the holding member 36 can be drawn into the radial bearing 33, and the leakage of the lubricating oil 35 from the clearance C can be prevented.

Further, the upper horizontal groove 39b formed on the upper end surface 33a of the radial bearing 33 is in communication with the outside of the housing 34 through the communication gap 48. Accordingly, a dynamic pressure generated in the housing 34 by the rotation of the rotating shaft 25 can be short-circuited through the communication groove 39 and the communication gap 48, thereby suppressing the expansion of air due to a reduction in static pressure and the generation of air dissolved in the lubricating oil 35. As a result, the leakage of the lubricating oil 35 can be prevented.

The bearing unit 5 is assembled in the following manner. The thrust bearing 38, the ring 31, and the radial bearing 33 are set in the housing 34. The holding member 36 impregnated with the lubricating oil 35 by dripping is fitted in the sealing member 37, and the assembly of the holding member 36 and the sealing member 37 is press-fitted to the upper opening 42 of the housing 34. Finally, the rotating shaft 25 is inserted through the sealing member 37 and the radial bearing 33.

In filling the lubricating oil 35 into the housing 34, the amount of the lubricating oil 35 is determined so that even when the lubricating oil 35 expands due to a temperature change, the leakage of the lubricating oil 35 from the housing 34 does not occur, whereas even when the lubricating oil 35 contracts due to a temperature change, the lubricating oil 35 is maintained in the clearance C defined between the rotating shaft 25 and the sealing member 37. In other words, the lubricating oil 35 is suitably supplied so that a change in level of the lubricating oil 35 due to a temperature change occurs within the range of the clearance C.

Since the radial bearing 33 is formed of sintered metal, the lubricating oil 35 is impregnated in the radial bearing 33. Further, the lubricating oil 35 is filled in the dynamic pressure generating grooves 40 and 41 for generating a dynamic pressure during rotation of the rotating shaft 25. Thus, the lubricating oil 35 is filled in all the gaps in the housing 34.

According to the bearing unit 5, the holding member 36 impregnated with the lubricating oil 35 is fitted in the sealing member 37, and the assembly of the holding member 36 and the sealing member 37 is provided at the upper opening 42 of the housing 34, wherein the inner wall portion 45 of the sealing member 37 is interposed between the holding member 36 and the rotating shaft 25. Accordingly, the contact of the holding member 36 and the rotating shaft 25 can be prevented, and the evaporation of the lubricating oil 35 from the upper opening 42 of the housing 34 can also be prevented. Further, the lubricating oil 35 can be supplied from the holding member 36 to the radial bearing 33 in the housing 34, thereby preventing a decrease in amount of the lubricating oil 35 in the housing 34.

The holding member 36 for holding the lubricating oil 35 is provided at the upper opening 42 of the housing 34 as viewed in FIG. 5. Accordingly, even when the bearing unit 5 is used in the condition shown in FIG. 4 so that the upper opening 42 of the housing 34 is directed downward, the lubricating oil 35 can be sucked into the holding member 36 to thereby prevent the leakage of the lubricating oil 35 from the upper opening 42. Further, even when the viscosity of the lubricating oil 35 decreases and the volume of the lubricating oil 35 increases due to an increase in use temperature, the leakage of the lubricating oil 35 from the upper opening 42 of the housing 34 can be prevented to thereby prevent a decrease in amount of the lubricating oil 35 in the housing 34.

Further, the communication gap 48 having the width X smaller than the minimum width of the clearance C is defined between the inner wall portion 45 of the sealing member 37 and the radial bearing 33. Accordingly, the lubricating oil 35 filled at the upper opening 42 of the housing 34 can be drawn from the clearance C through the communication gap 48 into the holding member 36 and the radial bearing 33, thereby preventing the leakage of the lubricating oil 35 from the clearance C defined between the inner wall portion 45 and the rotating shaft 25 to the outside of the housing 34. Accordingly, the bearing unit 5 can be used even in the condition where the upper opening 42 is directed downward. Further, the bearing unit 5 has such a structure capable of preventing the leakage of the lubricating oil 35, it is not necessary to apply an existing oil repellent finish for prevention of the leakage of a lubricating oil, thus realizing simplification of the manufacturing of the bearing unit 5. However, such an oil repellent finish may be applied to the tapering portion 29 of the rotating shaft 25 and the inner wall portion 45 of the sealing member 37, so as to more reliably prevent the leakage of the lubricating oil 35 from the clearance C. Further, since the communication groove 39 is in communication with the outside of the housing 34 through the communication gap 48, the dynamic pressure generated in the housing 34 can be short-circuited.

According to the bearing unit 5, the amount of the lubricating oil 35 filled in the housing 34 can be increased and a decrease in amount of the lubricating oil 35 can be prevented, so that the lubricating oil 35 can be effectively supplied to the radial bearing 33. Accordingly, it is possible to extend the life of the bearing unit 5, the life of the motor 1 using the bearing unit 5, and the life of the computer 50 using the motor 1.

The bearing unit according to the embodiment of the present invention is usable not merely as a bearing for a motor of a radiating device or a spindle motor of a disk drive, but also as bearings for various motors. Further, the bearing unit according to the embodiment of the present invention is usable for any mechanism having a rotating shaft and any mechanism for supporting a component rotating relative to a shaft, as well as for a motor.

It should be understood by those skilled in the art that various modifications, combinations, sub-combinations and alterations may occur depending on design requirements and other factor in so far as they are within the scope of the appended claims or the equivalents thereof.

What is claimed is:

1. A bearing unit comprising:
   a shaft;
   a radial bearing which supports an outer circumferential surface of said shaft and which has an upper end surface and a lower end surface;
   a housing for accommodating said radial bearing, said housing having an open end from which said shaft is inserted and a closed end opposite to said open end in the axial direction of said shaft;
   a lubricating oil filled in said housing to reduce rotational friction of said shaft;
   a holding member provided at said open end of said housing which holds said lubricating oil and which has an upper surface and a lower surface; and
   a sealing member for closing said open end of said housing to prevent leakage of said lubricating oil,
   wherein,
   said sealing member has a side wall portion interposed between said holding member and said shaft and opposed to the outer circumferential surface of said shaft, and
   the lower surface of the holding member is in contact with the upper end surface of the radial bearing.

2. The bearing unit according to claim 1, wherein said side wall portion of said sealing member is formed with a recess to define a gap between said side wall portion and the upper end surface of said radial bearing.

3. The bearing unit according to claim 1, wherein the outer circumferential surface of said shaft opposed to said side wall portion of said sealing member is tapered toward said open end of said housing.

4. The bearing unit according to claim 2, wherein said gap has a width smaller than that of a clearance defined between said side wall portion of said sealing member and said outer circumferential surface of said shaft.

5. The bearing unit according to claim 2, wherein said holding member is formed of a porous elastic material having a capillary force smaller than that of said radial bearing.

6. The bearing unit according to claim 2, wherein a communication passage for making the communication of said open end and said closed end of said housing is formed between said housing and said radial bearing, and said communication passage is in contact with said holding member.

7. The bearing unit according to claim 2, wherein said holding member is covered with said sealing member except the lower surface of the holding member that is in contact with the upper end surface of the radial bearing.

8. The bearing unit according to claim 7, wherein said sealing member is welded to said housing.

9. A motor having a rotor, a stator, and a bearing unit for rotatably supporting said rotor to said stator, wherein said bearing unit comprises:
   a shaft;
   a radial bearing which supports an outer circumferential surface of said shaft and which has an upper end surface and a lower end surface;
   a housing for accommodating said radial bearing, said housing having an open end from which said shaft is inserted and a closed end opposite to said open end in the axial direction of said shaft;
   a lubricating oil filled in said housing to reduce rotational friction of said shaft;
   a holding member provided at said open end of said housing which holds said lubricating oil and which has an upper surface and a lower surface; and
   a sealing member for closing said open end of said housing to prevent leakage of said lubricating
   wherein,
   said sealing member has a side wall portion interposed between said holding member and said shaft and opposed to the outer circumferential surface of said shaft, and the lower surface of the holding member is in contact with the upper end surface of the radial bearing.

10. Electronic equipment including a motor having a rotor, a stator, and a bearing unit for rotatably supporting said rotor to said stator, wherein said bearing unit comprises:

a shaft;

a radial bearing which supports an outer circumferential surface of said shaft and which has an upper end surface and a lower end surface;

a housing for accommodating said radial bearing, said housing having an open end from which said shaft is inserted and a closed end opposite to said open end in the axial direction of said shaft;

a lubricating oil filled in said housing to reduce rotational friction of said shaft;

a holding member provided at said open end of said housing which holds said lubricating oil and which has an upper surface and a lower surface; and a sealing member for closing said open end of said housing to prevent leakage of said lubricating oil, wherein, said sealing member a side wall portion interposed between said holding member and said shaft and opposed to the outer circumferential surface of said shaft, and the lower surface of the holding member is in contact with the upper end surface of the radial bearing.

* * * * *